United States Patent
Zheng et al.

(10) Patent No.: US 11,956,772 B2
(45) Date of Patent: Apr. 9, 2024

(54) SIDELINK TRANSMISSION METHOD AND DEVICE

(71) Applicant: VIVO MOBILE COMMUNICATION CO., LTD., Guangdong (CN)

(72) Inventors: Qian Zheng, Dongguan (CN); Xiaodong Yang, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 362 days.

(21) Appl. No.: 17/382,999

(22) Filed: Jul. 22, 2021

(65) Prior Publication Data

US 2021/0352687 A1    Nov. 11, 2021

Related U.S. Application Data

(63) Continuation of application No. PCT/CN2020/073189, filed on Jan. 20, 2020.

(30) Foreign Application Priority Data

Jan. 23, 2019   (CN) .......................... 201910064816.3

(51) Int. Cl.
*H04W 72/1263* (2023.01)
*H04W 72/21* (2023.01)
*H04W 80/02* (2009.01)

(52) U.S. Cl.
CPC ....... *H04W 72/1263* (2013.01); *H04W 72/21* (2023.01); *H04W 80/02* (2013.01)

(58) Field of Classification Search
CPC . H04W 72/1263; H04W 72/21; H04W 80/02; H04W 72/52; H04W 92/18; H04W 72/53; H04W 72/23; H04W 28/0278; H04W 72/51; H04W 72/20
See application file for complete search history.

(56) References Cited

U.S. PATENT DOCUMENTS

| 10,798,764 | B2* | 10/2020 | Fu ..................... H04W 28/0257 |
| 2014/0321293 | A1* | 10/2014 | Hwang ................ H04L 1/1692 370/242 |
| 2015/0271841 | A1* | 9/2015 | Yamada ............... H04W 72/02 370/329 |

(Continued)

FOREIGN PATENT DOCUMENTS

| CN | 104936292 A | 9/2015 |
| CN | 106304351 A | 1/2017 |

(Continued)

OTHER PUBLICATIONS

Second Office Action regarding Chinese Patent Application No. 201910064816.3, dated May 20, 2022. Translation provided by Bohui Intellectual Property.

(Continued)

*Primary Examiner* — Benjamin H Elliott, IV (74) *Attorney, Agent, or Firm* — Harness, Dickey & Pierce, P.L.C.

(57) ABSTRACT

A sidelink transmission method includes: performing configuration based on first configuration information, so that the terminal device simultaneously works in both a network device scheduling mode Mode 1 and a terminal device autonomous mode Mode 2.

20 Claims, 4 Drawing Sheets

(56) References Cited

U.S. PATENT DOCUMENTS

| | | | |
|---|---|---|---|
| 2015/0319746 A1* | 11/2015 | Lu | H04L 1/1812 |
| | | | 370/280 |
| 2016/0294491 A1* | 10/2016 | Wu | H04B 17/309 |
| 2017/0006653 A1* | 1/2017 | Zeng | H04W 72/23 |
| 2017/0126306 A1* | 5/2017 | Kim | H04W 72/044 |
| 2017/0215183 A1* | 7/2017 | Gulati | H04L 1/1896 |
| 2018/0091265 A1* | 3/2018 | Liu | H04L 1/08 |
| 2018/0227971 A1* | 8/2018 | Yasukawa | H04W 76/14 |
| 2019/0141764 A1* | 5/2019 | Fu | H04W 28/0268 |
| 2019/0215110 A1* | 7/2019 | Yang | H04W 76/27 |
| 2019/0215211 A1* | 7/2019 | Xue | H04L 5/0051 |
| 2019/0223124 A1* | 7/2019 | Tang | H04W 56/001 |
| 2019/0319723 A1* | 10/2019 | Axmon | H04B 17/309 |
| 2020/0052942 A1* | 2/2020 | Lin | H04W 36/0088 |
| 2020/0067621 A1* | 2/2020 | Hu | H04L 5/0048 |
| 2020/0099476 A1* | 3/2020 | Park | H04W 4/70 |
| 2020/0120674 A1* | 4/2020 | Lee | H04W 72/0453 |
| 2020/0137756 A1* | 4/2020 | Lee | H04W 72/0453 |
| 2020/0169986 A1* | 5/2020 | Lee | H04W 72/542 |
| 2020/0178039 A1* | 6/2020 | Lee | H04W 4/029 |
| 2020/0229198 A1* | 7/2020 | Kung | H04W 72/54 |
| 2020/0287665 A1* | 9/2020 | Lee | H04L 1/1874 |
| 2020/0351032 A1* | 11/2020 | Wu | H04W 72/56 |
| 2021/0136767 A1* | 5/2021 | Pitaval | H04W 74/004 |
| 2021/0185559 A1* | 6/2021 | Lee | H04L 47/2458 |
| 2021/0204301 A1* | 7/2021 | Lee | H04W 72/566 |
| 2021/0266945 A1* | 8/2021 | Ma | H04W 76/14 |
| 2021/0337604 A1* | 10/2021 | Popovic | H04W 74/008 |
| 2021/0352672 A1* | 11/2021 | Wu | H04W 16/14 |
| 2021/0352682 A1* | 11/2021 | Zheng | H04W 28/06 |
| 2021/0352687 A1* | 11/2021 | Zheng | H04W 72/1263 |
| 2022/0045798 A1* | 2/2022 | Tang | H04L 5/0053 |
| 2022/0070876 A1* | 3/2022 | Bangolae | H04W 76/27 |
| 2022/0104267 A1* | 3/2022 | Gao | H04W 72/1268 |
| 2022/0131731 A1* | 4/2022 | Yang | H04W 74/0816 |

FOREIGN PATENT DOCUMENTS

| | | |
|---|---|---|
| CN | 107852777 A | 3/2018 |
| CN | 108668373 A | 10/2018 |
| WO | WO-2015139592 A1 | 9/2015 |
| WO | WO-2017052690 A1 | 3/2017 |
| WO | WO-2017190662 A1 | 11/2017 |

OTHER PUBLICATIONS

First Office Action regarding Korean Patent Application No. 10-2021-7025940, dated Mar. 6, 2023. Translation provided.

"Sidelink control by NR and LTE Uu interface for V2X use cases," Intel Corporation, 3GPP TSG RAN WG1 Ad-Hoc Meeting 1901, R1-1900486, dated Jan. 25, 2019.

"MAC modeling for ProSe communication," LG Electronics Inc., 3GPP TSG-RAN WG2 Meeting #88, R2-145036, dated Nov. 21, 2014.

"Considerations on the cell concept in NR," ZTE Corporation et al., 3GPP TSG-RAN WG2 Meeting #96, R2-167832, dated Nov. 18, 2016.

"NR cell concept and connected mode mobility," ZTE Corporation, et al., 3GPP TSG-RAN WG2 NR AdHoc, R2-1700162, dated Jan. 19, 2017.

"List of open issues on NR MAC," Samsung, 3GPP TSG-RAN WG2 Meeting #102, R2-1807540, dated May 25, 2018.

"List of open issues on NR MAC," Samsung, 3GPP TSG-RAN WG2 Meeting #102, R2-1807540rm, dated May 25, 2018.

First Office Action regarding Chinese Patent Application No. 201910064816.3, dated Nov. 29, 2021. Translation provided by Bohui Intellectual Property.

"Support of mode switch and multiple mode coexistence for NR sidelink," Huawei, HiSilicon, 3GPP TSG-RAN WG2 Meeting #104, R2-1816524, dated Nov. 16, 2018.

"D2D communication resource mode configuration," ZTE, 3GPP TSG-RAN WG2 Meeting #86, R2-142146, dated May 23, 2014.

Supplementary European Search Report regarding Patent Application No. 20744860.6-1215/3917238; PCT/CN2020/073189, dated Mar. 9, 2022.

"Enhancements of Uu link to control sidelink," vivo, 3GPP TSG RAN WG1 Ad-Hoc Meeting 1901, R1-1900122, dated Jan. 25, 2019.

"Support of QoS for PC5-based V2V transport," Huawei, HiSilicon, 3GPP TSG-RAN WG2 Meeting #94, R2-163811, dated May 27, 2016.

"Feature lead summary for AI 7.2.4.3: Uu-based sidelink resource allocation/configuration," Huawei, 3GPP TSG RAN WG1 Meeting AH-1901, R1-1901316, dated Jan. 25, 2019.

International Search Report and Written Opinion of the International Searching Authority issued in PCT/CN2020/073189, dated Apr. 17, 2020; Translation provided by Bohui Intellectual Property.

OPPO. "Discussion on mode 2 resource allocation in NR-V2X," 3GPP TSG-RAN WG1 Meeting #95, R1-1812827, Nov. 16, 2018.

Fujitsu. "Discussion on Sidelink Bi-mode Transmission in NR-V2X" 3GPP TSG-RAN WG1 Meeting #94Bis, R1-1810595, Oct. 12, 2018.

\* cited by examiner

100

Perform configuration based on first configuration
information, so that a terminal device simultaneously works ～ S102
in both a Mode 1 and a Mode 2

SIDELINK TRANSMISSION METHOD AND DEVICE

CROSS-REFERENCE TO RELATED APPLICATIONS

This application is a Bypass Continuation Application of PCT/CN2020/073189 filed on Jan. 20, 2020, which claims priority to Chinese Patent Application No. 2019100648163, filed on Jan. 23, 2019, which are incorporated herein by reference in their entirety.

TECHNICAL FIELD

Embodiments of the present disclosure relate to the communications field, and in particular, to a sidelink (SL, or translated into a side link, a lateral link, or an edge link) transmission method and device.

BACKGROUND

A long term evolution (LTE) system supports SL transmission, that is, data transmission can be directly performed between terminal devices over a wireless air interface. In the LTE system, a terminal device works in only one resource allocation mode. In a new radio (NR) system, because more diversified quality of service (QoS) services need to be supported, the foregoing resource allocation mode probably cannot meet a data transmission QoS requirement.

SUMMARY

According to a first aspect, an SL transmission method is provided. The method is performed by a terminal device, and the method includes: performing configuration based on first configuration information, so that the terminal device simultaneously works in both a network device scheduling mode (also referred to as Mode 1) and a terminal device autonomous mode (also referred to as Mode 2).

According to a second aspect, an SL transmission method is provided. The method is performed by a network device, the method includes: sending first configuration information, where the first configuration information is used to instruct a terminal device to configure a resource allocation mode, and the resource allocation mode includes a Mode 1 and a Mode 2.

According to a third aspect, a terminal device is provided. The terminal device includes a configuration module, configured to perform configuration based on first configuration information, so that the terminal device simultaneously works in both a Mode 1 and a Mode 2.

According to a fourth aspect, a network device is provided. The network device includes a sending module, configured to send first configuration information, where the first configuration information is used to instruct a terminal device to configure a resource allocation mode, and the resource allocation mode includes a Mode 1 and a Mode 2.

According to a fifth aspect, a terminal device is provided. The terminal device includes a processor, a memory, and a program that is stored in the memory and executable on the processor, where when the processor executes the program, the steps of the SL transmission method in the first aspect are implemented.

According to a sixth aspect, a network device is provided. The network device includes a processor, a memory, and a program that is stored in the memory and executable on the processor, where when the processor executes the program, the steps of the SL transmission method in the second aspect are implemented.

According to a seventh aspect, a non-transitory computer-readable storage medium is provided. The non-transitory computer-readable storage medium stores a computer program, and when a processor executes the computer program, the steps of the SL transmission methods in the first aspect and the second aspect are implemented.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION OF EMBODIMENTS

To make the objectives, technical solutions, and advantages of this application clearer, the following clearly describes the technical solutions of this application with reference to the specific embodiments of this application and the corresponding accompanying drawings Apparently, the described embodiments are merely some rather than all of the embodiments of this application. All other embodiments obtained by a person of ordinary skill in the art based on the embodiments of this application shall fall within the protection scope of this application.

The term "and/or" in this specification describes an association relationship of associated objects, indicating that three relationships may exist. For example, A and/or B may indicate three cases: only A exists, both A and B exist, and only B exists. A character "/" in this specification indicates an "or" relationship between associated objects. For example, input/output indicates input or output.

It should be understood that the technical solutions in the embodiments of the present disclosure may be applied to various communications systems, such as global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) or a worldwide interoperability for microwave access (WiMAX) communications system, a 5G system, a new radio (NR) system, or a subsequent evolved communications system.

In some embodiments of the present disclosure, a terminal device may include but is not limited to a mobile station (MS), a mobile terminal, a mobile telephone, user equipment (UE), a handset, portable equipment, a vehicle, and the like. The terminal device may communicate with one or more core networks by using a radio access network (RAN). For example, the terminal device may be a mobile telephone (or referred to as a "cellular" telephone), or a computer having a wireless communication function; or the terminal device may be a portable, pocket-sized, handheld, computer built-in, or in-vehicle mobile apparatus.

In some embodiments of the present disclosure, a network device is an apparatus that is deployed in a radio access network and that is used to provide a wireless communication function for a terminal device. The network device may be a base station, and the base station may include various forms such as a macro base station, a micro base station, a relay station, or an access point. In systems that use different radio access technologies, devices that have a base station function may have different names. For example, in an LTE network, the network device is referred to as an evolved NodeB (eNB or eNodeB), and in a 3rd Generation (3G) network, the network device is referred to as a NodeB or a network device in the subsequent evolved communications system. However, the terms do not constitute a limitation.

Figure 1:
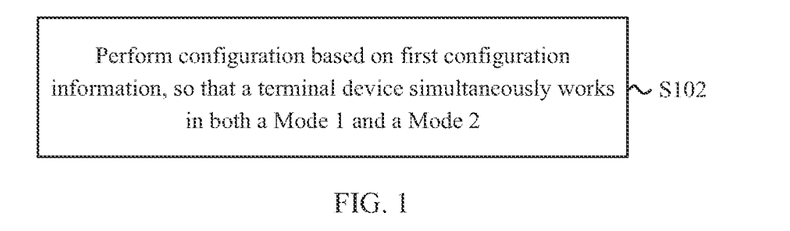
FIG. 1 is a schematic flowchart of an SL transmission method according to an embodiment of the present disclosure.

As shown in FIG. 1, an embodiment of the present disclosure provides an SL transmission method 100. The method may be performed by a terminal device, and includes the following steps.

S102: Perform configuration based on first configuration information, so that the terminal device simultaneously works in both a Mode 1 and a Mode 2.

Optionally, the foregoing first configuration information may be obtained in at least one of the following three manners:

being preconfigured;

being sent through a network device broadcast message; or being sent through dedicated radio resource control (RRC) signaling of network device.

If the foregoing first configuration information is sent through the network device broadcast message or the dedicated RRC signaling of network device, before step S102, the terminal device may further receive the first configuration information.

The Mode 1 mentioned in the embodiments of the present disclosure is a network device scheduling mode. For the Mode 1, the terminal device may obtain a sidelink control channel (PSCCH) resource pool configuration and an associated sidelink shared channel (PSSCH) resource pool configuration of the Mode 1 by receiving system broadcast signaling and the like sent by the network device. When the terminal device has to-be-transmitted data, the terminal device requests a dedicated Mode 1 communication resource from the network device through a buffer status report (BSR).

The Mode 2 mentioned in the embodiments of the present disclosure is a terminal device autonomous mode. For the Mode 2, the terminal device obtains a PSCCH resource pool configuration and an associated PSSCH resource pool configuration of the Mode 2 by receiving network device system broadcast signaling, or obtains a PSCCH resource pool configuration and an associated PSSCH resource pool configuration of the Mode 2 through the dedicated RRC signaling of network device, or determines a PSCCH resource pool configuration and an associated PSSCH resource pool configuration of the Mode 2 through preconfiguration information. In each PSCCH period, the terminal device randomly selects sending resources of a PSCCH and an associated PSSCH.

According to the SL transmission method provided in some embodiments of the present disclosure, the terminal device may perform related configuration based on configuration information, so that the terminal device can work in both the Mode 1 and the Mode 2 during SL transmission. The terminal device has diversified resource allocation modes, so that resource utilization efficiency of SL transmission can be improved, and different QoS requirements can be met.

For the foregoing improving resource utilization efficiency of SL transmission, in the related art, the terminal device supports only one single resource allocation mode, and cannot fully use communications resources. Especially, in an SL communication scenario, when a large amount of service data or service data of many types needs to be transmitted, the foregoing disadvantage is more obvious.

According to the SL transmission method provided in some embodiments of the present disclosure, after performing configuration based on configuration information, the terminal device can work in both the Mode 1 and the Mode 2, to make full use of SL resources. In addition, a correspondence between a service and the Mode 1 or the Mode 2 may be determined based on a QoS or a service type of the service, to meet different QoS requirements.

The first configuration information may be used to instruct the terminal device to perform related configuration of working in the Mode 1 and the Mode 2. Optionally, based on the foregoing embodiment, the first configuration information may include at least one of the following five types:

(1) Mapping relationship between an SL logical channel identifier used in SL transmission and an SL logical channel group identifier: Generally, there is a mapping relationship between one SL logical channel group identifier and a plurality of SL logical channel identifiers.

(2) Mapping relationship between a mode type and an SL logical channel identifier: The mode type herein includes at least one of the Mode 1 and the Mode 2. Optionally, the mapping relationship between a mode type and an SL logical channel identifier may be the following three cases: a mapping relationship between the Mode 1 and an SL logical channel identifier; or a mapping relationship between the Mode 2 and an SL logical channel identifier; or a mapping relationship between the Mode 1 and an SL logical channel identifier and a mapping relationship between the Mode 2 and an SL logical channel identifier.

(3) Mapping relationship between a mode type and an SL logical channel group identifier: The mode type herein includes at least one of the Mode 1 and the Mode 2. Optionally, the mapping relationship between a mode type and an SL logical channel group identifier may be the following three cases: a mapping relationship between the Mode 1 and an SL logical channel group identifier; or a mapping relationship between the Mode 2 and an SL logical channel group identifier; or a mapping relationship between the Mode 1 and an SL logical channel group identifier and a mapping relationship between the Mode 2 and an SL logical channel group identifier.

In the implementation of (2) or (3), in a case that the terminal device simultaneously works in both the Mode 1 and the Mode 2, a logical channel or a logical channel group corresponding to the Mode 1 may be distinguished from a logical channel or a logical channel group corresponding to the Mode 2.

(4) Mapping relationship between a mode type and a sidelink radio bearer identifier (SLRB ID): The mode type herein includes at least one of the Mode 1 and the Mode 2. Optionally, the mapping relationship between a mode type and an SERB ID may be the following three cases: a mapping relationship between the Mode 1 and an SLRB ID; or a mapping relationship between the Mode 2 and an SLRB ID; or a mapping relationship between the Mode 1 and an SERB ID and a mapping relationship between the Mode 2 and an SLRB ID.

In this implementation, the mapping relationship between a mode type and an SLRB ID is established. In a case that the terminal device simultaneously works in both the Mode 1 and the Mode 2, a correspondence between a service and the Mode 1 or the Mode 2 may be determined based on at least one of a QoS or a service type of the service, that is, different types of service data can be sent in different resource allocation modes (that is, the Mode 1 or the Mode 2) in this implementation.

(5) Mapping relationship between a mode type and a destination identifier (Destination ID): The mode type herein includes at least one of the Mode 1 and the Mode 2. Optionally, the mapping relationship between a mode type and a destination ID may be the following three cases: a mapping relationship between the Mode 1 and a destination ID; or a mapping relationship between the Mode 2 and a destination ID; or a mapping relationship between the Mode 1 and a destination ID and a mapping relationship between the Mode 2 and a destination ID.

In this implementation, the mapping relationship between a mode type and a destination ID is established, and a correspondence between a service and the Mode 1 or the Mode 2 may be determined based on at least one of a QoS or a service type of the service, that is, different types of service data can be sent in different resource allocation modes (that is, the Mode 1 or the Mode 2) in this implementation.

Figure 2:
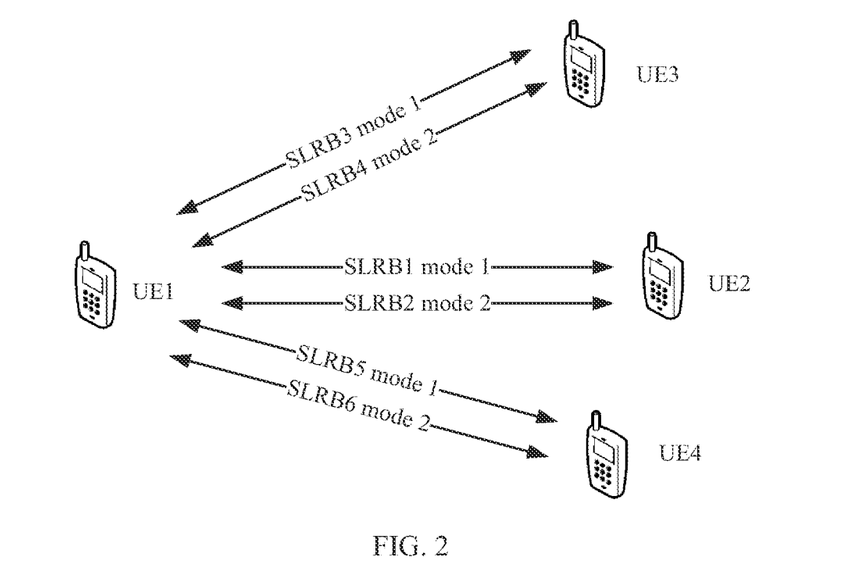
FIG. 2 is a schematic scenario diagram of an SL transmission method according to an embodiment of the present disclosure.
Figure 3:
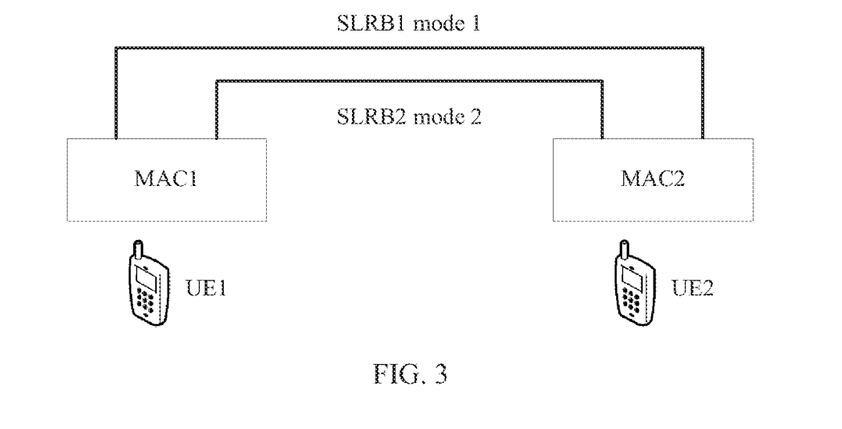
FIG. 3 is a schematic MAC diagram of an SL transmission method according to an embodiment of the present disclosure.

Based on the foregoing plurality of embodiments, in a case that the terminal device simultaneously works in both the Mode 1 and the Mode 2:

Optionally, as shown in FIG. 2 and FIG. 3, for terminal devices (UE1 and UE2) that perform SL communication, the Mode 1 and the Mode 2 may share a Media Access Control MAC entity.

Figure 4:
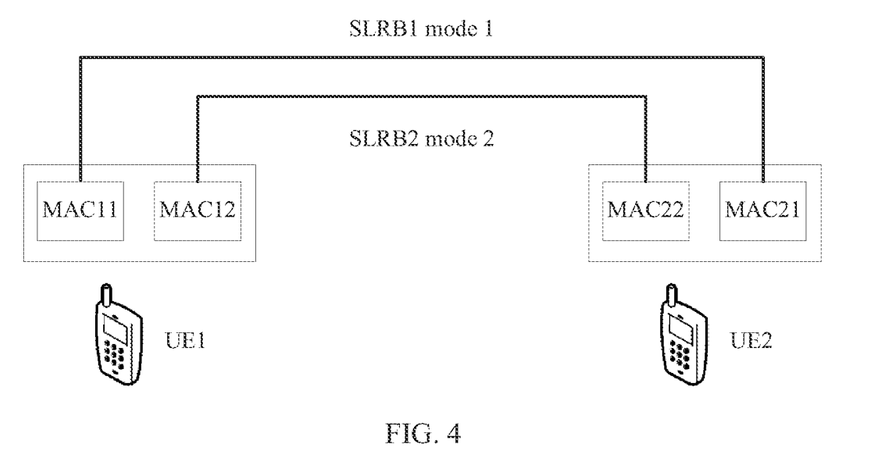
FIG. 4 is a schematic MAC diagram of an SL transmission method according to another embodiment of the present disclosure.

Optionally, as shown in FIG. 2 and FIG. 4, for terminal devices (UE1 and UE2) that perform SL communication, the Mode 1 and the Mode 2 may correspond to different MAC entities.

In the embodiments shown in FIG. 2 to FIG. 4, the first configuration information may further include a mapping relationship between a mode type and an SLRB ID.

The following separately describes two cases in which the Mode 1 and the Mode 2 share a MAC entity, and the Mode 1 and the Mode 2 correspond to different MAC entities.

In the embodiments shown in FIG. 2 and FIG. 3, terminal devices (for example, UE1 and UE2) that perform SL communication may separately create a MAC entity, and when both a mode 1 and a mode 2 of the UE1 and the UE2 work one MAC entity is shared. That is, in FIG. 3, when both the mode 1 and the mode 2 of the UE1 work, a MAC1 is shared, and when both the mode 1 and the mode 2 of the UE2 work, a MAC2 is shared.

The foregoing is merely described by using SL communication between the UE 1 and the UE2 as an example. As shown in FIG. 2, for SL communication between the UE1 and UE3, SL communication between the UE1 and UE4, and the like, the content described in each corresponding embodiment of the present disclosure is also applicable, and is not described again herein.

In a case that the Mode 1 and the Mode 2 share a MAC entity, the performing configuration based on first configuration information in step S102 in the foregoing several embodiments may further include: defining that the MAC entity shared by the Mode 1 and the Mode 2 performs at least one of the following behaviors:

(1) If there is no buffer data in currently configured SL logical channels (which may be all SL logical channels), a sidelink buffer status report (SL BSR) is triggered in a case that an SL logical channel on which data arrives (which may be one or more of the currently configured SL logical channels) corresponds to the Mode 1.

In this implementation, the first configuration information may include a mapping relationship between a mode type and an SL logical channel identifier.

(2) If there is buffer data in at least one of currently configured. SL logical channels (which may be all SL logical channels), an SL BSR is triggered in a case that an SL logical channel on which data arrives (which may be one or more of the currently configured SF logical channels) has a higher logical channel priority or the SL logical channel on which data arrives corresponds to the Mode 1.

In this implementation, the first configuration information may include a mapping relationship between a mode type and an SL logical channel identifier.

"An SL logical channel on which data arrives has a higher logical channel priority" mentioned in this implementation means that a priority of an SL logical channel on which data arrives currently is higher than a priority of an SL logical channel in which there is buffer data in the currently configured SL logical channels.

(3) If a retransmission SL BSR timer expires, an SL BSR is triggered in a case that there is buffer data in at least one of currently configured SL logical channels (which may be all SL logical channels), or an SL logical channel corresponding to the retransmission SL BSR timer corresponds to the Mode 1.

In this implementation, the first configuration information may include a mapping relationship between a mode type and an SL logical channel identifier.

In the foregoing plurality of implementations, when an SL BSR trigger condition is met, an SL BSR can be triggered in a timely manner, to request, from the network device in a timely manner, resources required for transmission in the Mode 1, thereby improving communication efficiency.

In addition, an SL BSR is triggered only in a case that buffer data arrives on a logical channel corresponding to the Mode 1, and the SL BSR is not triggered in a case that buffer data arrives on a logical channel corresponding to the Mode 2.

Optionally, in a case that the Mode 1 and the Mode 2 share a MAC entity, the performing configuration based on first configuration information in step S102 in the foregoing several embodiments may further include: defining that the MAC entity shared by the Mode 1 and the Mode 2 performs the following behavior:

ignoring buffer data in a target SL logical channel when a buffer size indicated by a BS field of an SL BSR is being calculated, where the target SL logical channel includes at least one of the following: an SL logical channel corresponding to the Mode 2 or an SL logical channel corresponding to a destination identifier corresponding to the Mode 2.

In the foregoing implementation, buffer data in an SL logical channel corresponding to the Mode 2 can be ignored, and only buffer data in an SL logical channel corresponding to the Mode 1 is calculated into the SL BSR, so that the Mode 1 and the Mode 2 can independently work without affecting each other.

In a case that the Mode 1 and the Mode 2 share a MAC entity, optionally, the terminal device may further perform flexible switching between resource allocation modes. Optionally, the terminal device may perform configuration based on second configuration information, so that the terminal device works only in the Mode 1 or the Mode 2, that is, cancels working in both the Mode 1 and the Mode 2.

The second configuration information may be obtained in at least one of the following manners:

being preconfigured;

being sent through a network device broadcast message; or being sent through dedicated RRC signaling of network device.

Optionally, the performing configuration based on second configuration information may include: defining that the MAC entity shared by the Mode 1 and the Mode 2 performs at least one of the following behaviors:

(1) cancelling a triggered SL BSR;

(2) cancelling a triggered scheduling request (SR), where the SR is triggered through an SL BSR;

(3) stopping or restarting a retransmission SL BSR timer; or (4) stopping or restarting a periodic SL BSR timer.

In the foregoing plurality of implementations, after the terminal device switches from working in both the Mode 1 and the Mode 2 to working in the Mode 1 or the Mode 2, and especially enters the Mode 2, the terminal device may cancel or stop a previous related configuration in a timely manner, and further may perform reconfiguration when working in the Mode 1 or the Mode 2, to avoid configuration impact caused by resource allocation mode switching, thereby improving communication effectiveness.

As shown in FIG. 2 and FIG. 4, for terminal devices (UE1 and UE2) that perform SL communication, the Mode 1 and the Mode 2 may correspond to different MAC entities. In this embodiment, a pair of terminal devices (UE1 and UE2) that perform SL communication may separately create a pair of MAC entities. Referring to FIG. 4, a mode 1 of the UE1 works at a MAC11, and a mode 2 works at a MAC12; and a mode 1 of the UE2 works at a MAC 21, and a mode 2 works at a MAC22.

In a case that the Mode 1 and the Mode 2 correspond to different MAC entities, the performing configuration based on first configuration information in step S102 in the foregoing several embodiments may further include: obtaining, based on the first configuration information, maximum transmit power P_max; maximum transmit power P_max1 of a MAC entity corresponding to the Mode 1; and maximum transmit power P_max2 of a MAC entity corresponding to the Mode 2.

In this way, the performing configuration based on first configuration information in step S102 in the foregoing several embodiments may further include: if the P_max is greater than a sum of the P_max1 and the P_max2, defining that the MAC entity corresponding to the Mode 1 and the MAC entity corresponding to Mode 2 perform one of the following four behaviors.

(1) Remaining power is allocated to the MAC entity corresponding to the Mode 1, or remaining power is allocated to the MAC entity corresponding to the Mode 2.

The remaining power herein may be obtained by using a difference between the P_max and the P_max1 and a difference between the P_max and the P_max2.

(2) Remaining power is allocated to the MAC entity corresponding to the Mode 1 and the MAC entity corresponding to the Mode 2 based on a first preset proportion.

In this implementation, the first preset proportion may be prestored. Optionally, for example, the first preset proportion may be 5:5 or 6:4.

(3) Remaining power is allocated to the MAC entity corresponding to the Mode 1 or the MAC entity corresponding to the Mode 2 based on a size relationship between a priority of to-be-transmitted data and a first preset threshold.

Optionally, for example, if the priority of the to-be-transmitted data is greater than or equal to the first preset threshold, the remaining power is allocated to the MAC entity corresponding to the Mode 1. If the priority of the to-be-transmitted data is less than the first preset threshold, the remaining power is allocated to the MAC entity corresponding to the Mode 2.

In this implementation, optionally, the to-be-transmitted data may be transmitted by using the MAC entity to which the remaining power is allocated.

(4) Remaining power is allocated to the MAC entity corresponding to the Mode 1 or the MAC entity corresponding to the Mode 2 based on a size relationship between a priority $P_1$ of to-be-transmitted data corresponding to the Mode 1 and a priority $P_2$ of to-be-transmitted data corresponding to the Mode 2.

Optionally, for example, if $P_1$ is greater than or equal to $P_2$, the remaining power is allocated to the MAC entity corresponding to the mode 1. If $P_1$ is less than $P_2$, the remaining power is allocated to the MAC entity corresponding to the mode 2.

Optionally, if the P_max is less than a sum of the P_max1 and the P_max2, it is defined that a MAC entity corresponding to the Mode 1 and a MAC entity corresponding to the Mode 2 perform one of the following four behaviors:

(1) The P_max1 or the P_max2 is reduced based on a difference between the P_max and the P_max1 and a difference between the P_max and the P_max2.

Optionally, the P_max1 or the P_max2 may be further reduced based on a value P obtained by subtracting the P_max from the sum of the P_max1 and the P_max2.

The power value reduced for the P_max1 or the P_max2 may be equal to the foregoing obtained value P, or may be greater than the foregoing obtained value P.

(2) The P_max1 and the P_max2 are reduced based on a second preset proportion.

In this implementation, the second preset proportion may be prestored. Optionally, for example, the second preset proportion may be 5:5 or 4:6.

The total power value reduced for the P_max1 or the P_max2 may be equal to the foregoing obtained value P, or may be greater than the foregoing obtained value P.

(3) The P_max1 or the P_max2 is reduced based on a size relationship between a priority of to-be-transmitted data and a second preset threshold.

Optionally, for example, if the priority of the to-be-transmitted data is greater than or equal to the second preset threshold, the P_max2 is reduced; or if the priority of the to-be-transmitted data is less than the second preset threshold, the P_max1 is reduced.

The power value reduced for the P_max1 or the P_max2 may be equal to the foregoing obtained value P, or may be greater than the foregoing obtained value P.

In this implementation, the to-be-transmitted data may be transmitted by using a MAC entity for which power is not reduced.

(4) The P_max1 or the P_max2 is reduced based on a size relationship between a priority $P_3$ of to-be-transmitted data corresponding to the Mode 1 and a priority $P_4$ of to-be-transmitted data corresponding to the Mode 2.

Optionally, for example, if $P_3$ is greater than or equal to $P_4$, the P_max2 is reduced; or if $P_3$ is less than $P_4$, the P_max1 is reduced.

The power value reduced for the P_max1 or the P_max2 may be equal to the foregoing obtained value P, or may be greater than the foregoing obtained value P.

For the foregoing several embodiments, optionally, the performing configuration based on first configuration information in step S102 may include: if a first resource corresponding to the Mode 1 conflicts with a second resource corresponding to the Mode 2, selecting a resource according to at least one of the following rules:

(1) The first resource or the second resource is preferentially used.

(2) It is determined, based on a size relationship between a priority of to-be-transmitted data and a third preset threshold, to use the first resource or the second resource.

Optionally, for example, if the priority of the to-be-transmitted data is greater than or equal to the third preset threshold, the first resource is used; or if the priority of the to-be-transmitted data is less than the third preset threshold, the second resource is used.

In this implementation, the to-be-transmitted data may be transmitted by using a resource selected after a resource conflict occurs.

(3) it is determined, based on a size relationship between a priority $P_5$ of to-be-transmitted data corresponding to the Mode 1 and a priority $P_6$ of to-be-transmitted data corresponding to the Mode 2, to use the first resource or the second resource.

Optionally, for example, if $P_5$ is greater than or equal to $P_6$, the first resource is used; or if $P_5$ is less than $P_6$, the second resource is used.

For the foregoing several embodiments, optionally, the performing configuration based on first configuration information in step S102 may further include: defining that the terminal device performs at least one of the following behaviors:

(1) sending sidelink control information SCI, where the SCI is used to indicate that SL scheduling is based on the Mode 1 or the Mode 2; or (2) sending sidelink feedback control information (SFCI), where the SFCI is used to indicate that SL hybrid automatic repeat request (HARQ) is based on the Mode 1 or the Mode 2.

The SL transmission method according to some embodiments of the present disclosure is described above in detail with reference to FIG. 1 to FIG. 4. An SL transmission method according to another embodiment of the present disclosure is described in detail below with reference to FIG. 5. It may be understood that interaction between a network device and a terminal device described on the network device side is the same as that described on the terminal device side in the method shown in FIG. 1. To avoid repetition, related descriptions are appropriately omitted.

Figure 5:
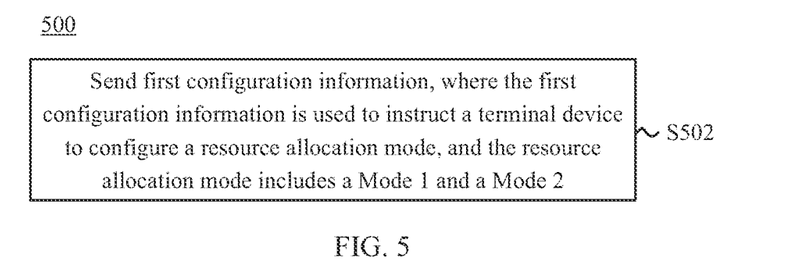
FIG. 5 is a schematic flowchart of an SL transmission method according to another embodiment of the present disclosure.

FIG. 5 is a schematic flowchart of implementing an SL transmission method according to some embodiments of the present disclosure, and the method may be applied to a network device side. As shown in FIG. 5, the method 500 includes the following step.

S502: Send first configuration information, where the first configuration information is used to instruct a terminal device to configure a resource allocation mode, and the resource allocation mode includes a Mode 1 and a Mode 2.

According to the SL transmission method provided in some embodiments of the present disclosure, the terminal device may perform related configuration based on configuration information, so that the terminal device can work in both the Mode 1 and the Mode 2 during SL transmission. The terminal device has diversified resource allocation modes, so that resource utilization efficiency of SL transmission can be improved, and different QoS requirements can be met.

The SL transmission method according to some embodiments of the present disclosure is described above in detail with reference to FIG. 1 to FIG. 5. A terminal device according to some embodiments of the present disclosure is described in detail below with reference to FIG. 6.

Figure 6:
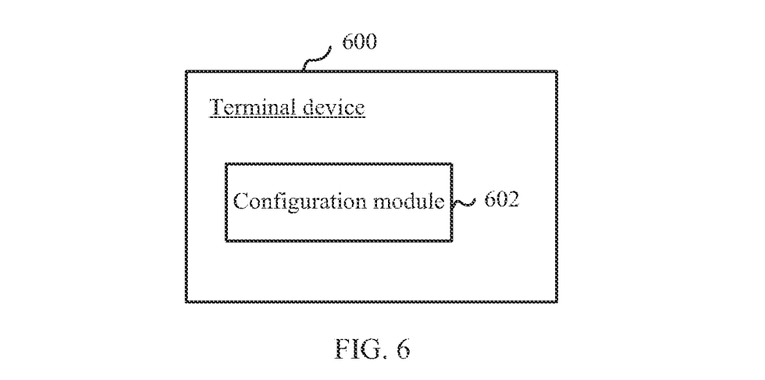
FIG. 6 is a schematic structural diagram of a terminal device according to an embodiment of the present disclosure.

FIG. 6 is a schematic structural diagram of a terminal device according to some embodiments of the present disclosure. As shown in FIG. 6, a terminal device 600 includes:

a configuration module 602, configured to perform configuration based on first configuration information, so that the terminal device simultaneously works in both a Mode 1 and a Mode 2.

In some embodiments of the present disclosure, the terminal device may perform related configuration based on configuration information, so that the terminal device can work in both the Mode 1 and the Mode 2 during SF transmission. The terminal device has diversified resource allocation modes, so that resource utilization efficiency of SF transmission can be improved, and different QoS requirements can be met.

Optionally, in an embodiment, the first configuration information includes at least one of the following:

a mapping relationship between an SL logical channel identifier and an SL logical channel group identifier;

a mapping relationship between a mode type and an SL logical channel identifier;

a mapping relationship between a mode type and an SF logical channel group identifier;

a mapping relationship between a mode type and an SL radio bearer identifier; or a mapping relationship between a mode type and a destination identifier, where the mode type includes the Mode 1 and/or the Mode 2.

Optionally, in an embodiment,
the Mode 1 and the Mode 2 share a MAC entity; or
the Mode 1 and the Mode 2 correspond to different MAC entities.

Optionally, in an embodiment, the Mode 1 and the Mode 2 share a MAC entity, and the configuration module 602 may be configured to:
define that the MAC entity performs at least one of the following behaviors:
if there is no buffer data in currently configured SL logical channels, triggering a SL BSR in a case that an SL logical channel on which data arrives corresponds to the Mode 1;
if there is buffer data in at least one of currently configured SL logical channels, triggering an SL BSR in a case that an SL logical channel on which data arrives has a higher logical channel priority and the SL logical channel on which data arrives corresponds to the Mode 1; or
if a retransmission SL BSR tinier expires, triggering an SL BSR in a case that there is buffer data in at least one of currently configured SL logical channels, or an SL logical channel corresponding to the retransmission SL, BSR timer corresponds to the Mode 1.

Optionally, in an embodiment, the Mode 1 and the Mode 2 share a MAC entity, and the configuration module 602 may be configured to:
define that the shared MAC entity performs the following behavior:
ignoring buffer data in a target SL logical channel when a buffer size indicated by a BS field of an SL BSR is being calculated, where
the target SL logical channel includes at least one of the following: an SL logical channel corresponding to the Mode 2 or an SL logical channel corresponding to a destination identifier corresponding to the Mode 2.

Optionally, in an embodiment, the configuration module 602 may be further configured to:
perform configuration based on second configuration information, so that the terminal device works in the Mode 1 or the Mode 2.

Optionally, in an embodiment, the Mode 1 and the Mode 2 share a MAC entity, and the configuration module 602 may be configured to:
define that the MAC entity performs at least one of the following behaviors:
cancelling a triggered SL BSR;
cancelling a triggered SR, where the SR is triggered through an SL BSR;
stopping or restarting a retransmission SL BSR timer; or
stopping or restarting a periodic SL BSR timer.

Optionally, in an embodiment, the Mode 1 and the Mode 2 correspond to different MAC entities, and the configuration module 602 may be configured to:
obtain, based on the first configuration information,
maximum transmit power P_max of the terminal device;
maximum transmit power P_max1 of a MAC entity corresponding to the Mode 1; and
maximum transmit power P_max2 of a MAC entity corresponding to the Mode 2.

Optionally, in an embodiment, the Mode 1 and the Mode 2 correspond to different MAC entities, and the configuration module 602 may be configured to:
if the P_max is greater than a sum of the P_max1 and the P_max2, define that a MAC entity corresponding to the Mode 1 and a MAC entity corresponding to the Mode 2 perform one of the following four behaviors:
allocating remaining power to the MAC entity corresponding to the Mode 1, or allocating remaining power to the MAC entity corresponding to the Mode 2; or
allocating remaining power to the MAC entity corresponding to the Mode 1 and the MAC entity corresponding to the Mode 2 based on a first preset proportion; or
allocating remaining power to the MAC entity corresponding to the Mode 1 or the MAC entity corresponding to the Mode 2 based on a size relationship between a priority of to-be-transmitted data and a first preset threshold; or
allocating remaining power to the MAC entity corresponding to the Mode 1 or the MAC entity corresponding to the Mode 2 based on a size relationship between a priority of to-be-transmitted data corresponding to the Mode 1 and a priority of to-be-transmitted data corresponding to the Mode 2.

Optionally, in an embodiment, the Mode 1 and the Mode 2 correspond to different MAC entities, and the configuration module 602 may be configured to: if the P_max is less than a sum of the P_max1 and the P_max2, define that a MAC entity corresponding to the Mode 1 and a MAC entity corresponding to the Mode 2 perform one of the following four behaviors:
reducing the P_max1 or the P_max2 based on a difference between the P_max and the P_max1 and a difference between the P_max and the P_max2; or
reducing the P_max1 and the P_max2 based on a second preset proportion; or
reducing the P_max1 or the P_max2 based on a size relationship between a priority of to-be-transmitted data and a second preset threshold; or
reducing the P_max1 or the P_max2 based on a size relationship between a priority of to-be-transmitted data corresponding to the Mode 1 and a priority of to-be-transmitted data corresponding to the Mode 2.

Optionally, in an embodiment, the configuration module 602 may be configured to:
if a first resource corresponding to the Mode 1 conflicts with a second resource corresponding to the Mode 2, select a resource according to at least one of the following rules:
preferentially using the first resource or preferentially using the second resource;
determining, based on a size relationship between a priority of to-be-transmitted data and a third preset threshold, to use the first resource or the second resource; or
determining, based on a size relationship between a priority of to-be-transmitted data corresponding to the Mode 1 and a priority of to-be-transmitted data corresponding to the Mode 2, to use the first resource or the second resource.

Optionally, in an embodiment, the configuration module 602 may be configured to:
define that the terminal device 600 performs at least one of the following:
sending sidelink control information (SCI), where the SCI is used to indicate that SL scheduling is based on the Mode 1 or the Mode 2; or sending sidelink feedback control information (SFCI), where the SFCI is used to indicate that SL HARQ is based on the Mode 1 or the Mode 2.

Optionally, in an embodiment, the first configuration information is obtained in at least one of the following manners:

being preconfigured;

being sent through a network device broadcast message; or being sent through dedicated RRC signaling of network device.

For the terminal device 600 according to some embodiments of the present disclosure, reference may be made to the corresponding procedure of the method 100 according to some embodiments of the present disclosure, and the units/modules in the terminal device 600 and the foregoing operations and/or functions are respectively for implementing the corresponding procedures of the method 100. For brevity, details are not described herein again.

Figure 7:
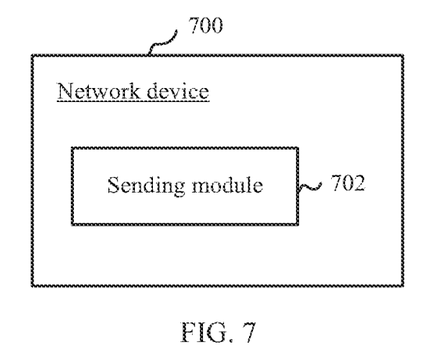
FIG. 7 is a schematic structural diagram of a network device according to an embodiment of the present disclosure.

FIG. 7 is a schematic structural diagram of a network device according to some embodiments of the present disclosure. As shown in FIG. 7, a network device 700 includes:

a sending module 702, configured to send first configuration information, where the first configuration information is used to instruct a terminal device to configure a resource allocation mode, and the resource allocation mode includes a Mode 1 and a Mode 2.

In some embodiments of the present disclosure, the terminal device may perform related configuration based on configuration information, so that the terminal device can work in both the Mode 1 and the Mode 2 during SL transmission. The terminal device has diversified resource allocation modes, so that resource utilization efficiency of SL transmission can be improved, and different QoS requirements can be met.

The network device 700 according to some embodiments of the present disclosure may be corresponding to the procedure of the method 500 in some embodiments of the present disclosure, and the units/modules in the network device 700 and the foregoing operations and/or functions are respectively for implementing the corresponding procedures of the method 500. For brevity, details are not described herein again.

Figure 8:
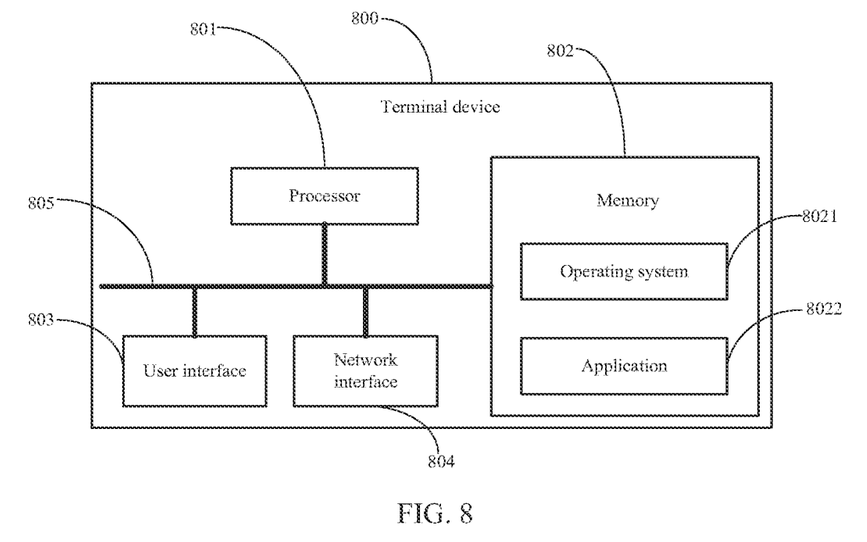
FIG. 8 is a schematic structural diagram of a terminal device according to another embodiment of the present disclosure.

FIG. 8 is a block diagram of a terminal device according to another embodiment of the present disclosure. As shown in FIG. 8, a terminal device 800 includes: at least one processor 801, a memory 802, at least one network interface 804, and a user interface 803. All components of the terminal device 800 are coupled together by using the bus system 805. It can be understood that the bus system 805 is configured to implement connection and communication between these components. In addition to a data bus, the bus system 805 may include a power bus, a control bus, and a status signal bus. However, for clear description, various buses are marked as the bus system 805 in FIG. 8.

The user interface 803 may include a display, a keyboard, or a clicking device (for example, a mouse, a trackball), a touch panel, or a touchscreen.

It may be understood that the memory 802 in some embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct iambus random access memory (DRRAM). The memory 802 in the system and the method described in some embodiments of the present disclosure is intended to include, but is not limited to, these memories and memories of any other proper type.

In some implementations, the memory 802 stores the following element: an executable module or a data structure, a subset thereof, or an extended set thereof: an operating system 8021 and an application 8022.

The operating system 8021 includes various system programs, such as a framework layer, a core library layer, and a driver layer, and is configured to implement various basic services and process hardware-based tasks. The application 8022 includes various applications, for example, a media player and a browser, and is configured to implement various application services. A program for implementing the method in some embodiments of the present disclosure may be included in the application 8022.

In some embodiments of the present disclosure, the terminal device 800 further includes a program that is stored in the memory 802 and executable on the processor 801, and when the processor 801 executes the program, the following steps of the method 100 are implemented.

The methods disclosed in some embodiments of the present disclosure may be applied to the processor 801 or implemented by the processor 801. The processor 801 may be an integrated circuit chip having a signal processing capability. During implementation, each step of the foregoing method may be completed by using an integrated logic circuit of hardware in the processor 801 or an instruction in a form of software. The foregoing processor 801 may be a general-purpose processor, a digital signal processor (DSP), an application specific integrated circuit (ASIC), a field programmable gate array (FPGA) or another programmable logic component, a discrete gate or a transistor logic component, or a discrete hardware component. The processor 801 may implement or execute the methods, steps, and logic block diagrams disclosed in some embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 802, and the processor 801 reads information in the memory 802 and completes the steps in the foregoing method in combination with hardware of the processor 801. The non-transitory computer-readable storage medium stores a computer program, and when the computer program is executed by the processor 801, the steps of the foregoing embodiment of method 100 are performed.

It can be understood that those embodiments described in some embodiments of the present disclosure can be implemented with hardware, software, firmware, middleware, microcode, or a combination thereof. For hardware implementation, a processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in this application.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented in the processor or outside the processor.

The terminal device 800 can implement each process implemented by the terminal device in the foregoing embodiments. To avoid repetition, details are not described herein again.

Figure 9:
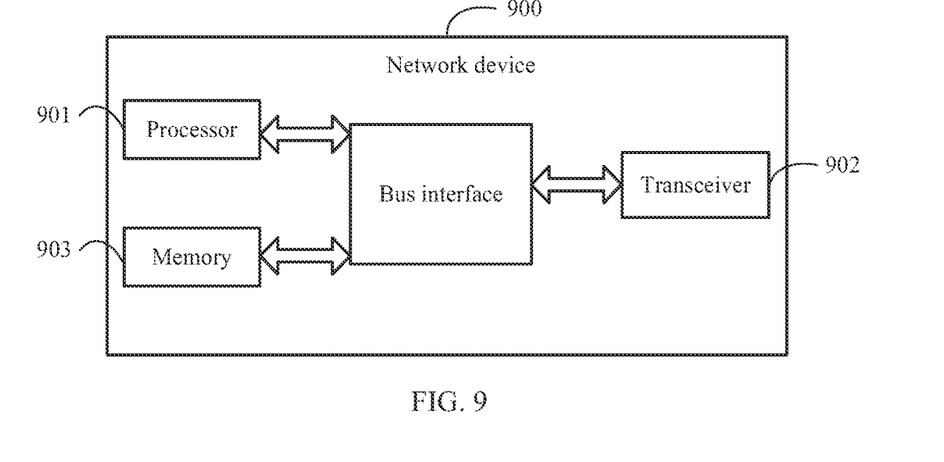
FIG. 9 is a schematic structural diagram of a network device according to another embodiment of the present disclosure.

Referring to FIG. 9, FIG. 9 is a structural diagram of a network device applied to some embodiments of the present disclosure, and the network device can implement details of the method embodiment 500 and achieve a same effect. As shown in FIG. 9, a network device 900 includes a processor 901, a transceiver 902, a memory 903, and a bus interface.

In some embodiments of the present disclosure, the network device 900 further includes a program that is stored in the memory 903 and executable on the processor 901, and when the processor 901 executes the program, the steps of the method 500 are implemented.

In FIG. 9, a bus architecture may include any quantity of interconnected buses and bridges. Optionally, various circuits of one or more processors represented by the processor 901 and a memory represented by the memory 903 are interconnected. The bus architecture may further link various other circuits such as a peripheral device, a voltage regulator, and a power management circuit. These are well known in the art, and therefore are not further described in this specification. The bus interface provides an interface. The transceiver 902 may be a plurality of components. To be specific, the transceiver 902 includes a transmitter and a receiver, and provides a unit configured to communicate with various other apparatuses on a transmission medium.

The processor 901 is responsible for managing the bus architecture and common processing, and the memory 903 may store data used when the processor 901 performs an operation.

Some embodiments of the present disclosure further provide a non-transitory computer-readable storage medium. The non-transitory computer-readable storage medium stores a computer program, and when a processor executes the computer program, the processes of the method embodiment 100 and the method embodiment 500 are implemented and a same technical effect can be achieved. To avoid repetition, details are not described herein again. The non-transitory computer-readable storage medium is, for example, a read-only memory (RUM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive, Under enlightenment of the present disclosure, a person of ordinary skills in the art may make many forms without departing from the aims of the present disclosure and the protection scope of claims, all of which fall within the protection of the present disclosure.

What is claimed is:

1. A sidelink (SL) transmission method, performed by a terminal device and comprising:
    performing configuration based on first configuration information, wherein the terminal device simultaneously works in both a network device scheduling mode Mode 1 and a terminal device autonomous mode Mode 2 based on the configuration;
    wherein any one of:
        (1) in a case that the Mode 1 and the Mode 2 share a media access control (MAC) entity, the performing configuration based on the first configuration information comprises:
        defining that the MAC entity performs at least one of following behaviors:
            in response to no buffer data in currently configured SL logical channels, triggering a sidelink buffer status report (SL BSR) in a case that an SL logical channel on which data arrives corresponds to the Mode 1;
            in response to buffer data in at least one of the currently configured SL logical channels, triggering an SL BSR in a case that an SL logical channel on which data arrives has a higher logical channel priority or the SL logical channel on which data arrives corresponds to the Mode 1; or
            in response to a retransmission SL BSR timer expiring, triggering an SL BSR in a case that there is buffer data in at least one of the currently configured SL logical channels, or an SL logical channel corresponding to the retransmission SL BSR timer corresponds to the Mode 1;
        (2) in a case that the Mode 1 and the Mode 2 share a MAC entity, the performing configuration based on the first configuration information comprises:

defining that the MAC entity performs the following behavior:
ignoring buffer data in a target SL logical channel when a buffer size indicated by a BS field of an SL BSR is being calculated, wherein
the target SL logical channel comprises at least one of an SL logical channel corresponding to the Mode 2 or an SL logical channel corresponding to a destination identifier corresponding to the Mode 2;
or
(3) in a case that the Mode 1 and the Mode 2 share a MAC entity, the performing configuration based on the first configuration information comprises:
in response to a first resource corresponding to the Mode 1 conflicting with a second resource corresponding to the Mode 2, selecting a resource according to at least one of following rules:
preferentially using the first resource or preferentially using the second resource;
determining, based on a size relationship between a priority of to-be-transmitted data and a third preset threshold, to use the first resource or the second resource; or
determining, based on a size relationship between a priority of to-be-transmitted data corresponding to the Mode 1 and a priority of to-be-transmitted data corresponding to the Mode 2, to use the first resource or the second resource.

2. The method according to claim 1, wherein the first configuration information comprises at least one of:
a mapping relationship between an SL logical channel identifier and an SL logical channel group identifier;
a mapping relationship between a mode type and an SL logical channel identifier;
a mapping relationship between a mode type and an SL logical channel group identifier;
a mapping relationship between a mode type and an SL radio bearer identifier; or
a mapping relationship between a mode type and a destination identifier, wherein
the mode type comprises the Mode 1 and/or the Mode 2.

3. The method according to claim 2, wherein
the Mode 1 and the Mode 2 share the MAC entity; or
the Mode 1 and the Mode 2 correspond to different MAC entities.

4. The method according to claim 1, further comprising:
performing configuration based on second configuration information, wherein the terminal device works in the Mode 1 or the Mode 2.

5. The method according to claim 4, wherein the performing configuration based on second configuration information comprises:
defining that the MAC entity performs at least one of following behaviors:
cancelling a triggered SL BSR;
cancelling a triggered scheduling request (SR), wherein the SR is triggered through an SL BSR;
stopping or restarting a retransmission SL BSR timer; or
stopping or restarting a periodic SL BSR timer.

6. The method according to claim 3, wherein the Mode 1 and the Mode 2 correspond to different MAC entities, and the method further comprises: obtaining, based on the first configuration information,
maximum transmit power P_max of the terminal device,
maximum transmit power P_max1 of a MAC entity corresponding to the Mode 1, and
maximum transmit power P_max2 of a MAC entity corresponding to the Mode 2.

7. The method according to claim 6, wherein the performing configuration based on first configuration information comprises: in response to the P_max being greater than a sum of the P_max1 and the P_max2, defining that the MAC entity corresponding to the Mode 1 and the MAC entity corresponding to the Mode 2 perform the following behavior:
allocating remaining power to the MAC entity corresponding to the Mode 1, or allocating remaining power to the MAC entity corresponding to the Mode 2; or
allocating remaining power to the MAC entity corresponding to the Mode 1 and the MAC entity corresponding to the Mode 2 based on a first preset proportion; or
allocating remaining power to the MAC entity corresponding to the Mode 1 or the MAC entity corresponding to the Mode 2 based on a size relationship between a priority of to-be-transmitted data and a first preset threshold; or
allocating remaining power to the MAC entity corresponding to the Mode 1 or the MAC entity corresponding to the Mode 2 based on a size relationship between a priority of to-be-transmitted data corresponding to the Mode 1 and a priority of to-be-transmitted data corresponding to the Mode 2.

8. The method according to claim 6, wherein the performing configuration based on first configuration information comprises: in response to the P_max being less than a sum of the P_max1 and the P_max2, defining that the MAC entity corresponding to the Mode 1 and the MAC entity corresponding to the Mode 2 perform following behavior:
reducing the P_max1 or the P_max2 based on a difference between the P_max and the Pmax1 and a difference between the P_max and the Pmax2;
reducing the P_max1 and the P_max2 based on a second preset proportion;
reducing the P_max1 or the P_max2 based on a size relationship between a priority of to-be-transmitted data and a second preset threshold; or
reducing the P_max1 or the P_max2 based on a size relationship between a priority of to-be-transmitted data corresponding to the Mode 1 and a priority of to-be-transmitted data corresponding to the Mode 2.

9. The method according to claim 1, wherein the performing configuration based on first configuration information comprises:
defining that the terminal device performs at least one of:
sending sidelink control information (SCI), wherein the SCI is used to indicate that SL scheduling is based on the Mode 1 or the Mode 2; or
sending sidelink feedback control information (SFCI), wherein the SFCI is used to indicate that SL hybrid automatic repeat request (HARQ) is based on the Mode 1 or the Mode 2.

10. The method according to claim 1, wherein the first configuration information is obtained in at least one of following manners:
being preconfigured;
being sent through a network device broadcast message; or
being sent through dedicated radio resource control (RRC) signaling of network device.

11. A terminal device, comprising a memory, a processor, and a program that is stored in the memory and executable on the processor, wherein the program, when executed by the processor, causes the terminal device to perform:

performing configuration based on first configuration information, wherein the terminal device simultaneously works in both a network device scheduling mode Mode 1 and a terminal device autonomous mode Mode 2 based on the configuration;

wherein any one of:

(1) in a case that the Mode 1 and the Mode 2 share a media access control (MAC) entity, the performing configuration based on the first configuration information comprises:

defining that the MAC entity performs at least one of following behaviors:
in response to no buffer data in currently configured SL logical channels, triggering a sidelink buffer status report (SL BSR) in a case that an SL logical channel on which data arrives corresponds to the Mode 1;
in response to buffer data in at least one of the currently configured SL logical channels, triggering an SL BSR in a case that an SL logical channel on which data arrives has a higher logical channel priority or the SL logical channel on which data arrives corresponds to the Mode 1; or
in response to a retransmission SL BSR timer expiring, triggering an SL BSR in a case that there is buffer data in at least one of the currently configured SL logical channels, or an SL logical channel corresponding to the retransmission SL BSR timer corresponds to the Mode 1;

(2) in a case that the Mode 1 and the Mode 2 share a MAC entity, the performing configuration based on the first configuration information comprises:
defining that the MAC entity performs the following behavior:
ignoring buffer data in a target SL logical channel when a buffer size indicated by a BS field of an SL BSR is being calculated, wherein
the target SL logical channel comprises at least one of an SL logical channel corresponding to the Mode 2 or an SL logical channel corresponding to a destination identifier corresponding to the Mode 2;
or (3) in a case that the Mode 1 and the Mode 2 share a MAC entity, the performing configuration based on the first configuration information comprises:
in response to a first resource corresponding to the Mode 1 conflicting with a second resource corresponding to the Mode 2, selecting a resource according to at least one of following rules:
preferentially using the first resource or preferentially using the second resource;
determining, based on a size relationship between a priority of to-be-transmitted data and a third preset threshold, to use the first resource or the second resource; or
determining, based on a size relationship between a priority of to-be-transmitted data corresponding to the Mode 1 and a priority of to-be-transmitted data corresponding to the Mode 2, to use the first resource or the second resource.

12. The terminal device according to claim 11, wherein the program, when executed by the processor, causes the terminal device to perform:
defining that the terminal device performs at least one of:
sending sidelink control information (SCI), wherein the SCI is used to indicate that SL scheduling is based on the Mode 1 or the Mode 2; or
sending sidelink feedback control information (SFCI), wherein the SFCI is used to indicate that SL hybrid automatic repeat request (HARQ) is based on the Mode 1 or the Mode 2.

13. The terminal device according to claim 11, wherein the Mode 1 and the Mode 2 share the MAC entity; or the Mode 1 and the Mode 2 correspond to different MAC entities.

14. The terminal device according to claim 13, wherein the Mode 1 and the Mode 2 correspond to different MAC entities, and the computer program, when executed by the processor, causes the terminal device to further perform:
obtaining, based on the first configuration information, maximum transmit power P_max of the terminal device, maximum transmit power P_max1 of a MAC entity corresponding to the Mode 1, and maximum transmit power P_max2 of a MAC entity corresponding to the Mode 2.

15. The terminal device according to claim 14, wherein the performing configuration based on first configuration information comprises: in response to the P_max being greater than a sum of the P_max1 and the P_max2, defining that the MAC entity corresponding to the Mode 1 and the MAC entity corresponding to the Mode 2 perform the following behavior:
allocating remaining power to the MAC entity corresponding to the Mode 1, or allocating remaining power to the MAC entity corresponding to the Mode 2; or
allocating remaining power to the MAC entity corresponding to the Mode 1 and the MAC entity corresponding to the Mode 2 based on a first preset proportion; or
allocating remaining power to the MAC entity corresponding to the Mode 1 or the MAC entity corresponding to the Mode 2 based on a size relationship between a priority of to-be-transmitted data and a first preset threshold; or
allocating remaining power to the MAC entity corresponding to the Mode 1 or the MAC entity corresponding to the Mode 2 based on a size relationship between a priority of to-be-transmitted data corresponding to the Mode 1 and a priority of to-be-transmitted data corresponding to the Mode 2.

16. A non-transitory computer-readable storage medium, wherein the non-transitory computer-readable storage medium stores a computer program, and the computer program, when executed by a processor of a terminal device, causes the terminal device to perform:
performing configuration based on first configuration information, wherein the terminal device simultaneously works in both a network device scheduling mode Mode 1 and a terminal device autonomous mode Mode 2 based on the configuration;
wherein any one of:
(1) in a case that the Mode 1 and the Mode 2 share a media access control (MAC) entity, the performing configuration based on the first configuration information comprises:
defining that the MAC entity performs at least one of following behaviors:
in response to no buffer data in currently configured SL logical channels, triggering a sidelink buffer status report (SL BSR) in a case that an SL logical channel on which data arrives corresponds to the Mode 1;

in response to buffer data in at least one of the currently configured SL logical channels, triggering an SL BSR in a case that an SL logical channel on which data arrives has a higher logical channel priority or the SL logical channel on which data arrives corresponds to the Mode 1; or in response to a retransmission SL BSR timer expiring, triggering an SL BSR in a case that there is buffer data in at least one of the currently configured SL logical channels, or an SL logical channel corresponding to the retransmission SL BSR timer corresponds to the Mode 1;

(2) in a case that the Mode 1 and the Mode 2 share a MAC entity, the performing configuration based on the first configuration information comprises:

defining that the MAC entity performs the following behavior:

ignoring buffer data in a target SL logical channel when a buffer size indicated by a BS field of an SL BSR is being calculated, wherein the target SL logical channel comprises at least one of an SL logical channel corresponding to the Mode 2 or an SL logical channel corresponding to a destination identifier corresponding to the Mode 2;

or (3) in a case that the Mode 1 and the Mode 2 share a MAC entity, the performing configuration based on the first configuration information comprises:

in response to a first resource corresponding to the Mode 1 conflicting with a second resource corresponding to the Mode 2, selecting a resource according to at least one of following rules:

preferentially using the first resource or preferentially using the second resource;

determining, based on a size relationship between a priority of to-be-transmitted data and a third preset threshold, to use the first resource or the second resource; or determining, based on a size relationship between a priority of to-be-transmitted data corresponding to the Mode 1 and a priority of to-be-transmitted data corresponding to the Mode 2, to use the first resource or the second resource.

17. The non-transitory computer-readable storage medium according to claim 16, wherein the Mode 1 and the Mode 2 share the MAC entity; or
the Mode 1 and the Mode 2 correspond to different MAC entities.

18. The non-transitory computer-readable storage medium according to claim 17, the Mode 1 and the Mode 2 correspond to different MAC entities, and the computer program, when executed by the processor, causes the terminal device to further perform:

obtaining, based on the first configuration information, maximum transmit power P_max of the terminal device, maximum transmit power P_max1 of a MAC entity corresponding to the Mode 1, and maximum transmit power P_max2 of a MAC entity corresponding to the Mode 2.

19. The non-transitory computer-readable storage medium according to claim 18, wherein the performing configuration based on first configuration information comprises: in response to the P_max being greater than a sum of the P_max1 and the P_max2, defining that the MAC entity corresponding to the Mode 1 and the MAC entity corresponding to the Mode 2 perform the following behavior:

allocating remaining power to the MAC entity corresponding to the Mode 1, or allocating remaining power to the MAC entity corresponding to the Mode 2; or allocating remaining power to the MAC entity corresponding to the Mode 1 and the MAC entity corresponding to the Mode 2 based on a first preset proportion; or allocating remaining power to the MAC entity corresponding to the Mode 1 or the MAC entity corresponding to the Mode 2 based on a size relationship between a priority of to-be-transmitted data and a first preset threshold; or allocating remaining power to the MAC entity corresponding to the Mode 1 or the MAC entity corresponding to the Mode 2 based on a size relationship between a priority of to-be-transmitted data corresponding to the Mode 1 and a priority of to-be-transmitted data corresponding to the Mode 2.

20. The non-transitory computer-readable storage medium according to claim 19, wherein the performing configuration based on first configuration information comprises: in response to the P_max being less than a sum of the P_max1 and the P_max2, defining that the MAC entity corresponding to the Mode 1 and the MAC entity corresponding to the Mode 2 perform following behavior:

reducing the P_max1 or the P_max2 based on a difference between the P_max and the Pmax1 and a difference between the P_max and the Pmax2;

reducing the P_max1 and the P_max2 based on a second preset proportion;

reducing the P_max1 or the P_max2 based on a size relationship between a priority of to-be-transmitted data and a second preset threshold; or reducing the P_max1 or the P_max2 based on a size relationship between a priority of to-be-transmitted data corresponding to the Mode 1 and a priority of to-be-transmitted data corresponding to the Mode 2.

* * * * *